(12) United States Patent
Mohammad

(10) Patent No.: US 8,978,466 B2
(45) Date of Patent: Mar. 17, 2015

(54) SYSTEM FOR DECORATIVE SPACE-SAVING MEASURING CUPS

(71) Applicant: Naveed Mohammad, Miami, FL (US)

(72) Inventor: Naveed Mohammad, Miami, FL (US)

(*) Notice: Subject to any disclaimer, the term of this patent is extended or adjusted under 35 U.S.C. 154(b) by 81 days.

(21) Appl. No.: 14/017,304

(22) Filed: Sep. 3, 2013

(65) Prior Publication Data

US 2014/0060179 A1    Mar. 6, 2014

Related U.S. Application Data

(60) Provisional application No. 61/695,917, filed on Aug. 31, 2012.

(51) Int. Cl.
*G01F 19/00* (2006.01)
*G09B 19/00* (2006.01)

(52) U.S. Cl.
CPC .................................. *G01F 19/002* (2013.01)
USPC ............................................. 73/427; 434/127

(58) Field of Classification Search
USPC ............................................. 73/427; 434/127
See application file for complete search history.

(56) References Cited

U.S. PATENT DOCUMENTS

| 4,127,189 A | * | 11/1978 | Shumrak et al. | 206/520 |
| 5,769,229 A | * | 6/1998 | Andress et al. | 206/505 |
| 2014/0255884 A1 | * | 9/2014 | Highet | 434/127 |

* cited by examiner

*Primary Examiner* — Lisa Caputo
*Assistant Examiner* — Jamel Williams

(57) ABSTRACT

A system for decorative space-saving measuring cups is a set of modified nesting doll that can be used to measure sequential volumetric quantities. Each of the nesting dolls can split apart into a first measuring cup and a second measuring cup, which are sized to hold two different volumes of a substance. The second measuring cup of an arbitrary nesting doll is always elevated by the second measuring cup of the next-largest nesting doll so that the second measuring cup of the arbitrary nesting doll is easier to grasp.

16 Claims, 11 Drawing Sheets

SYSTEM FOR DECORATIVE SPACE-SAVING MEASURING CUPS

The current application claims a priority to the U.S. Provisional Patent application Ser. No. 61/695,917 filed on Aug. 31, 2012. The current application is filed on Sep. 3, 2013 while Aug. 31, 2013 was on a weekend. The next business day is Sep. 3, 2013 while Sep. 1, 2013 was a weekend and Sep. 2, 2013 was a national holiday (Labor Day).

FIELD OF THE INVENTION

The present invention relates generally to a set of measuring containers. Furthermore, the containers are in the shape of Matryoshka dolls and can be stacked and nested within one another. Additionally, each half of the doll acts as a separate measuring container.

BACKGROUND OF THE INVENTION

A Matryoshka doll is a set of dolls, decreasing in size, that can be rested one inside another. Traditionally these dolls are made of wood. The Matryoshka doll design has been incorporated into the use of measuring cups, where each half of each doll is a unique size measuring cup. In these designs the inner dolls sit at the bottom of the outer dolls making them difficult to remove. Often times it is necessary to flip the bottom pieces upside down in order to remove the inner pieces. This can be problematic as the preferred material for these dolls is ceramic and it is easy for the inner piece to fall out and break when flipped over. As a result most designs have settled for using dolls made of plastic.

Therefore it is the object of the present invention to provide a design that allows the inner doll measuring cups to be easily removed from the outer doll measuring cups. The bottoms of the inner cups are raised such that the inner bottom cup rests in a position raised above the outer bottom cup. In addition the inner bottom cups can still lie flat on a level surface. This design also allows for Matryoshka doll measuring cups to be made of ceramic, their preferred material, as the cups are much less likely to break while being removed.

DETAILED DESCRIPTIONS OF THE INVENTION

All illustrations of the drawings are for the purpose of describing selected versions of the present invention and are not intended to limit the scope of the present invention.

Figure 1:
FIG. 1 is a perspective view of the different sized nesting dolls.
Figure 2:
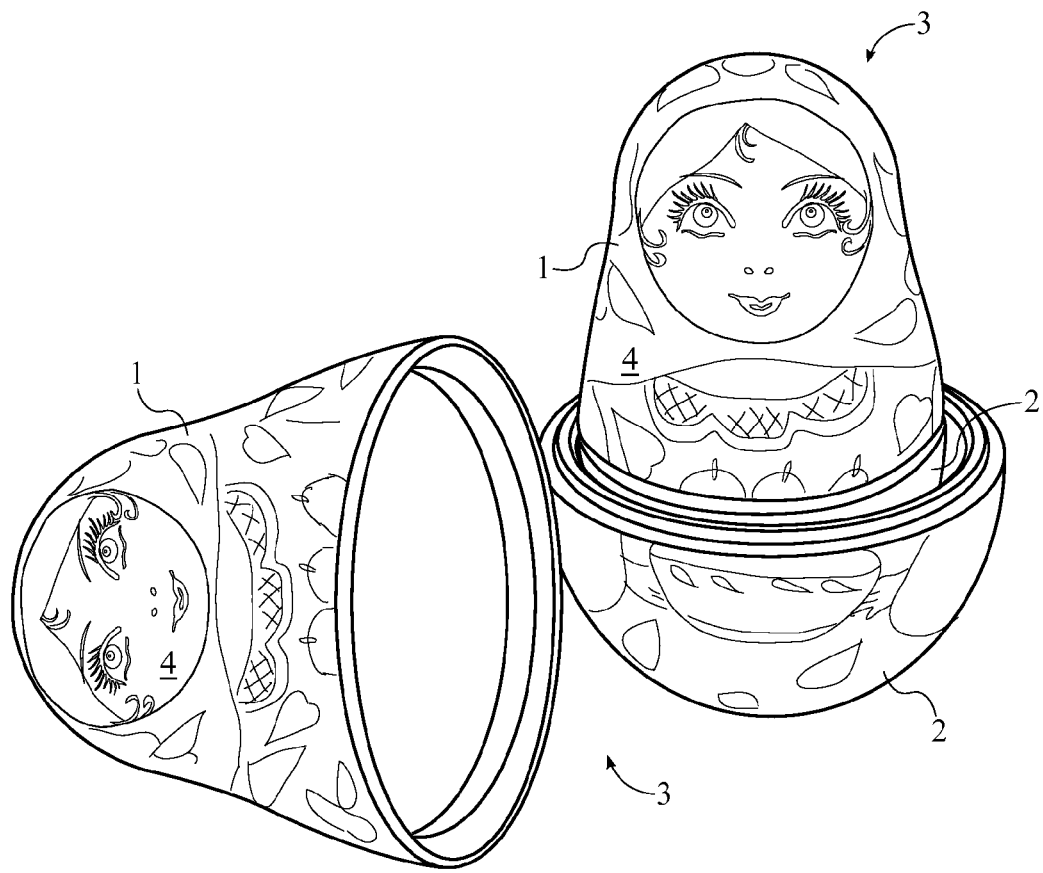
FIG. 2 is a perspective view showing a nesting doll being split into the first measuring cup and the second measuring cup.
Figure 3A:
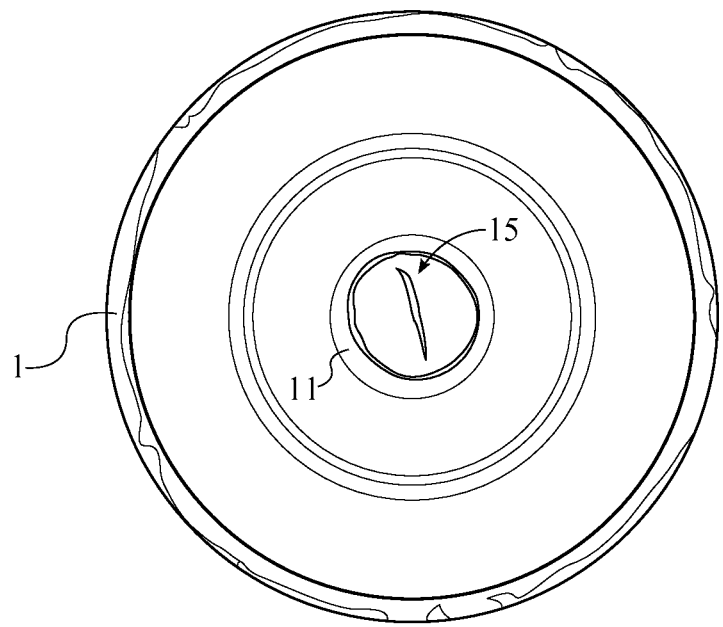
FIG. 3A is a view looking into the first measuring cup.
Figure 3B:
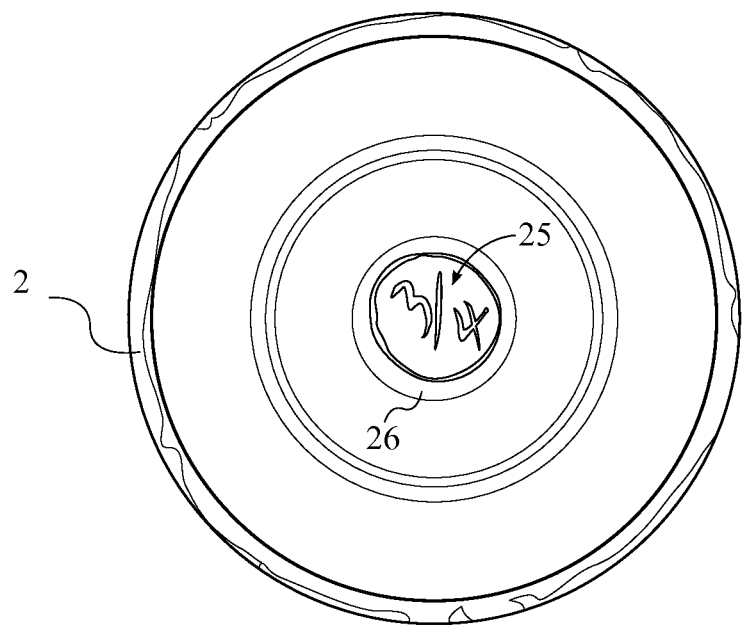
FIG. 3B is a view looking into the second measuring cup.
Figure 3C:
FIG. 3C is a perspective view showing the first measuring cup and the second measuring cup holding a substance.

As can be seen in FIGS. 1 and 2, the present invention is a system for decorative space-saving measuring cups, which are used to measure quantities of a substance such as liquids or bulk solids. The present invention comprises a plurality of nesting dolls 3, which are used as the space-saving technique for the present invention. Each of the plurality of nesting dolls 3 is a different sequential size so that each of the plurality of nesting dolls 3 has a different volumetric capacity and has the ability to fit inside the next-largest nesting doll. In addition, each of the plurality of nesting dolls 3 comprises a first measuring cup 1 and a second measuring cup 2. Each of the plurality of nesting dolls 3 is a kind of enclosed capsule, which can then be broken into the first measuring cup 1 and the second measuring cup 2. The first measuring cup 1 and the second measuring cup 2 are designed to hold to two different quantities, which is illustrated in FIG. 3C. More specifically, the first measuring cup 1 is sized to hold a larger volume than the second measuring cup 2 because the internal volume of the second measuring cup 2 will house additional components and will consequently have less internal volume to hold substances than the first measuring cup 1.

In the preferred embodiment of the present invention, the plurality of nesting dolls 3 is shaped to resemble traditional Matryoshka dolls, each of which is typically split into nearly equal halves. Also in the preferred embodiment, the plurality of nesting dolls 3 has an outer doll, a middle doll, and an inner doll. For the outer doll, the first measuring cup 1 is sized to hold a volumetric quantity of one cup, and the second measuring cup 2 is sized to hold a volumetric quantity of three-fourths of a cup. For the middle doll, the first measuring cup 1 is sized to hold a volumetric quantity of two-thirds of a cup, and the second measuring cup 2 is sized to hold a volumetric quantity of one-half of a cup. For the inner doll, the first measuring cup 1 is sized to hold a volumetric quantity of one-third of a cup, and the second measuring cup 2 is sized to hold a volumetric quantity of one-fourth of a cup. The plurality of nesting dolls 3 is preferably made of ceramic but can be made of other suitable materials as well, such as plastic or wood.

Figure 6:
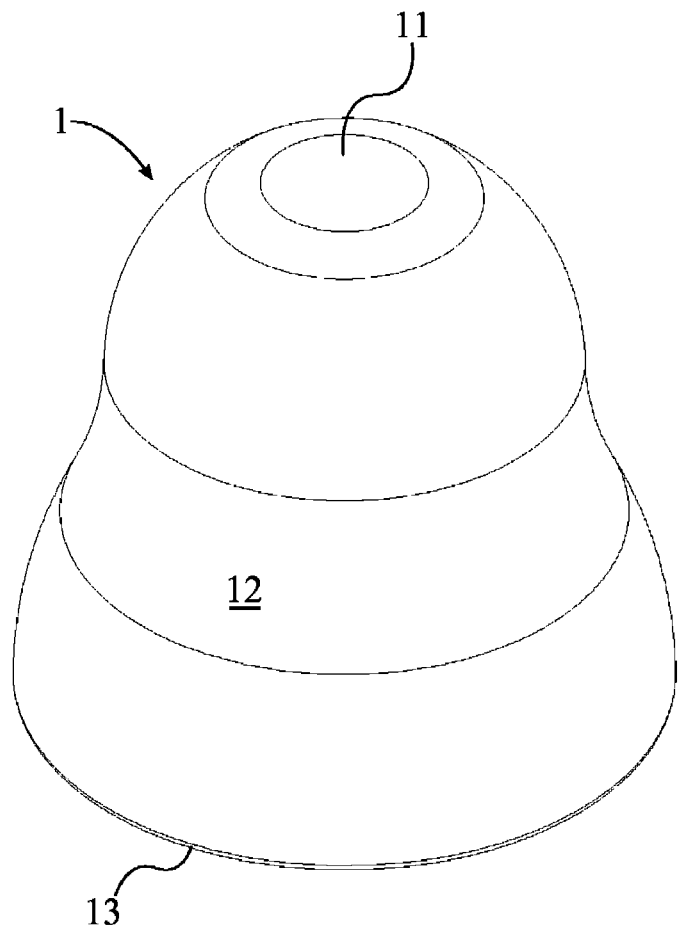
FIG. 6 is a top perspective view of the first measuring cup
Figure 7:
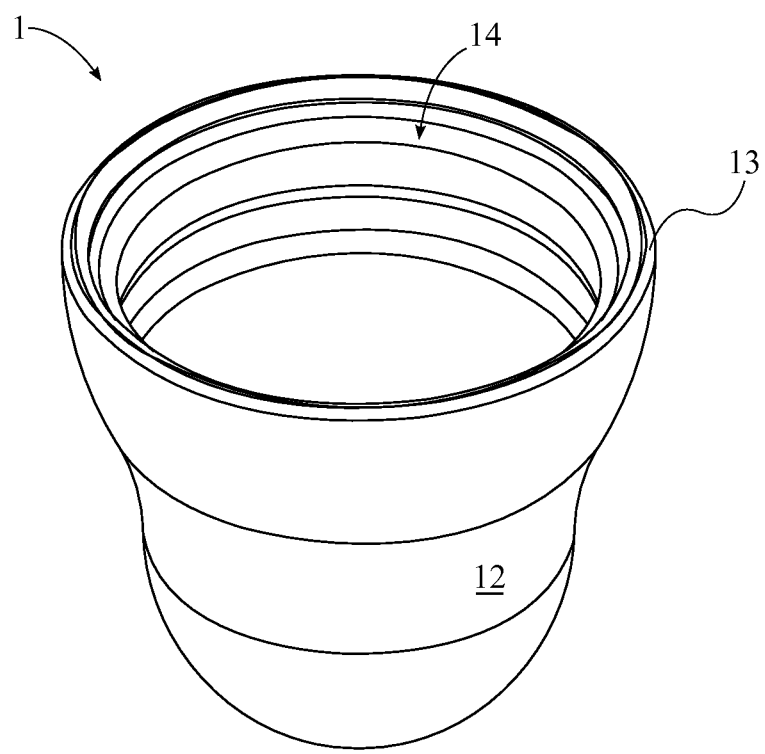
FIG. 7 is a bottom perspective view of the first measuring cup.

The first measuring cup 1 and the second measuring cup 2 allow the present invention to hold and quantify different amounts of a substance. As can be seen in FIGS. 6 and 7, the first measuring cup 1 comprises a first flat base 11, a first lateral portion 12, a first brim 13, a first notch 14, and a first volume label 15. The first flat base 11 allows the first measuring cup 1 to contain a substance from the bottom. The first flat base 11 also allows the first measuring cup 1 to evenly rest upon another flat surface such as a table or a kitchen counter. The first lateral portion 12 allows the first measuring cup 1 to contain the substance from the side. Thus, the first flat base 11 must be perpendicularly positioned and perimetrically connected to the first lateral portion 12, which prevents any spillage of the substance over the first brim 13. The first brim 13 is the pouring edge of the first measuring cup 1 and is positioned opposite to the first flat base 11 along the first lateral portion 12. The first notch 14 is integrated around the first brim 13 and allows the first measuring cup 1 to attach to the second measuring cup 2.

Figure 8:
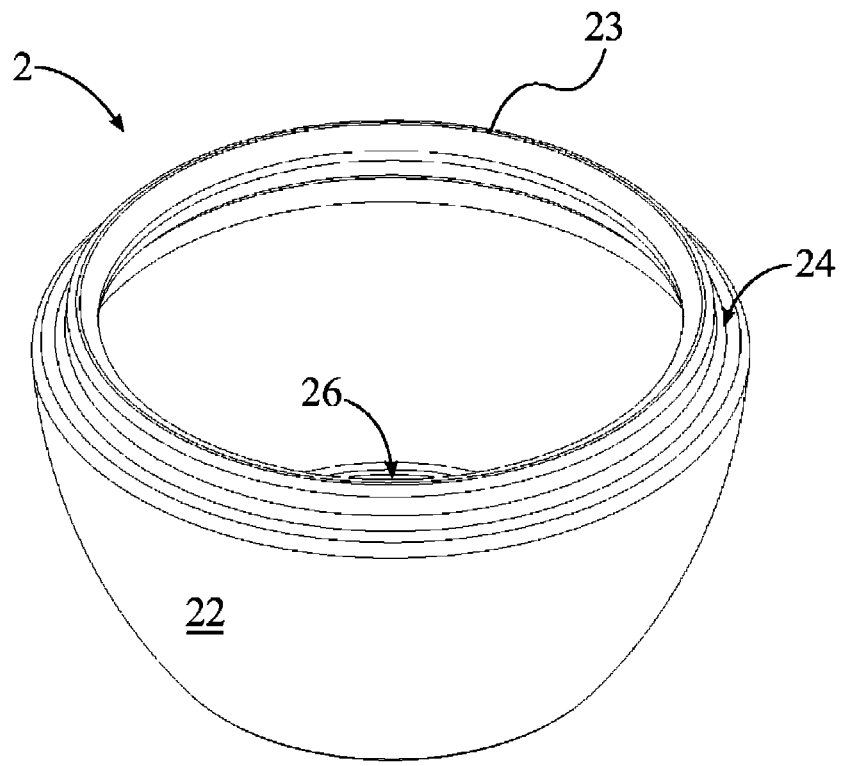
FIG. 8 is a top perspective view of the second measuring cup
Figure 9:
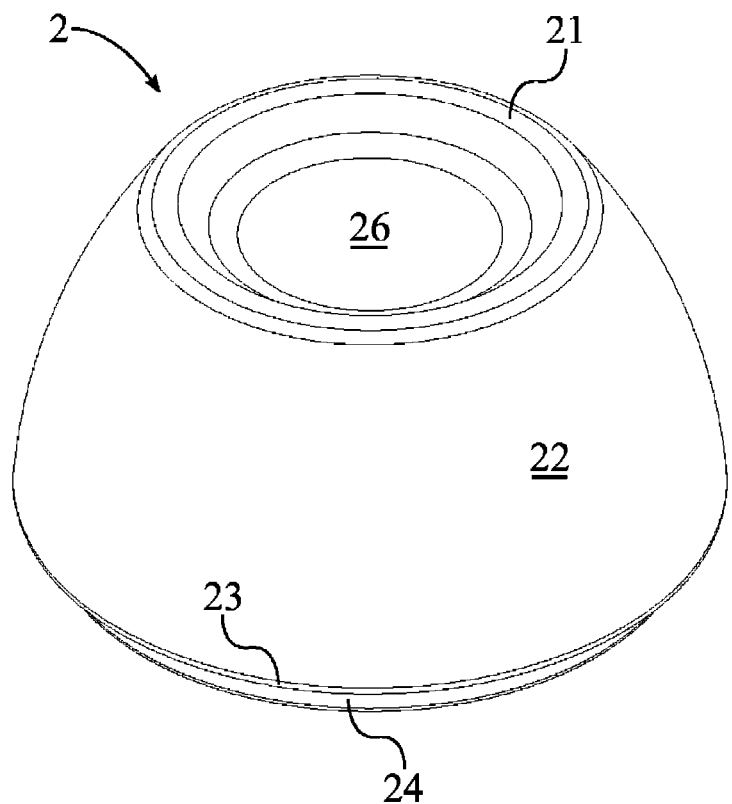
FIG. 9 is a bottom perspective view of the second measuring cup.

Similarly, the second measuring cup 2 comprises a second flat base 21, a second lateral portion 22, a second brim 23, a second notch 24, a second volume label 25, and a pedestal 26, which are shown in FIGS. 8 and 9. The second flat base 21 allows the second measuring cup 2 to contain a substance from the bottom. The second flat base 21 also allows the second measuring cup 2 to evenly rest upon another flat surface such as a table or a kitchen counter. The second lateral portion 22 allows the second measuring cup 2 to contain the substance from the side. Thus, the second flat base 21 must be perpendicularly positioned and perimetrically connected to the second lateral portion 22, which prevents any spillage of the substance over the second brim 23. The second brim 23 is the pouring edge of the second measuring cup 2 and is positioned opposite to the second flat base 21 along the second lateral portion 22. The second notch 24 is integrated around the second brim 23 and allows the second measuring cup 2 to attach to the first measuring cup 1. Different from the first measuring cup 1, the pedestal 26 is used to more efficiently stack the second measuring cup 2 from different nesting dolls onto each other. Thus, the pedestal 26 is located inside the second lateral portion 22 and centrally connected onto the second flat base 21 so that the second measuring cup 2 can evenly support the next-smallest nesting doll.

Figure 4:
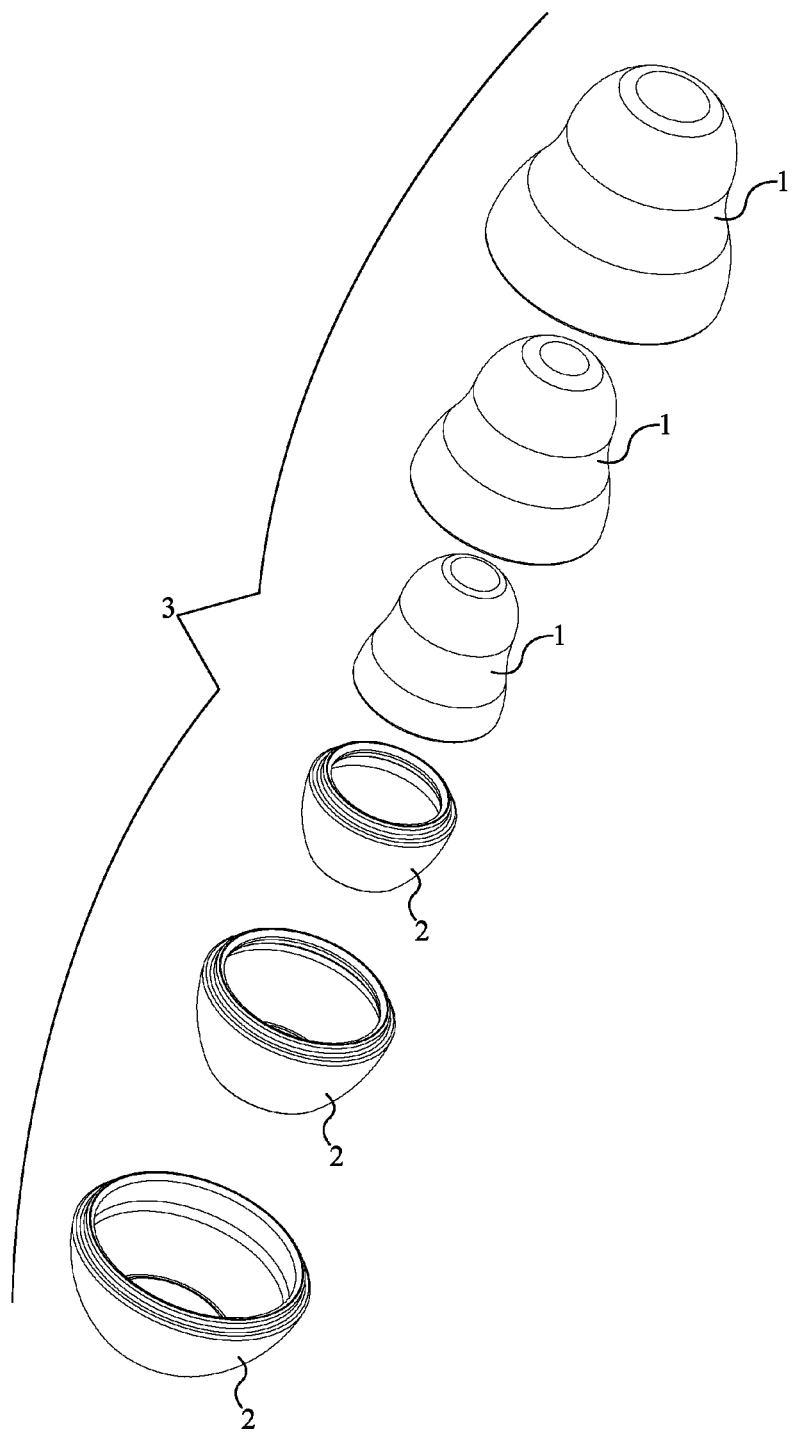
FIG. 4 is a perspective view of the present invention in an exploded state.
Figure 5:
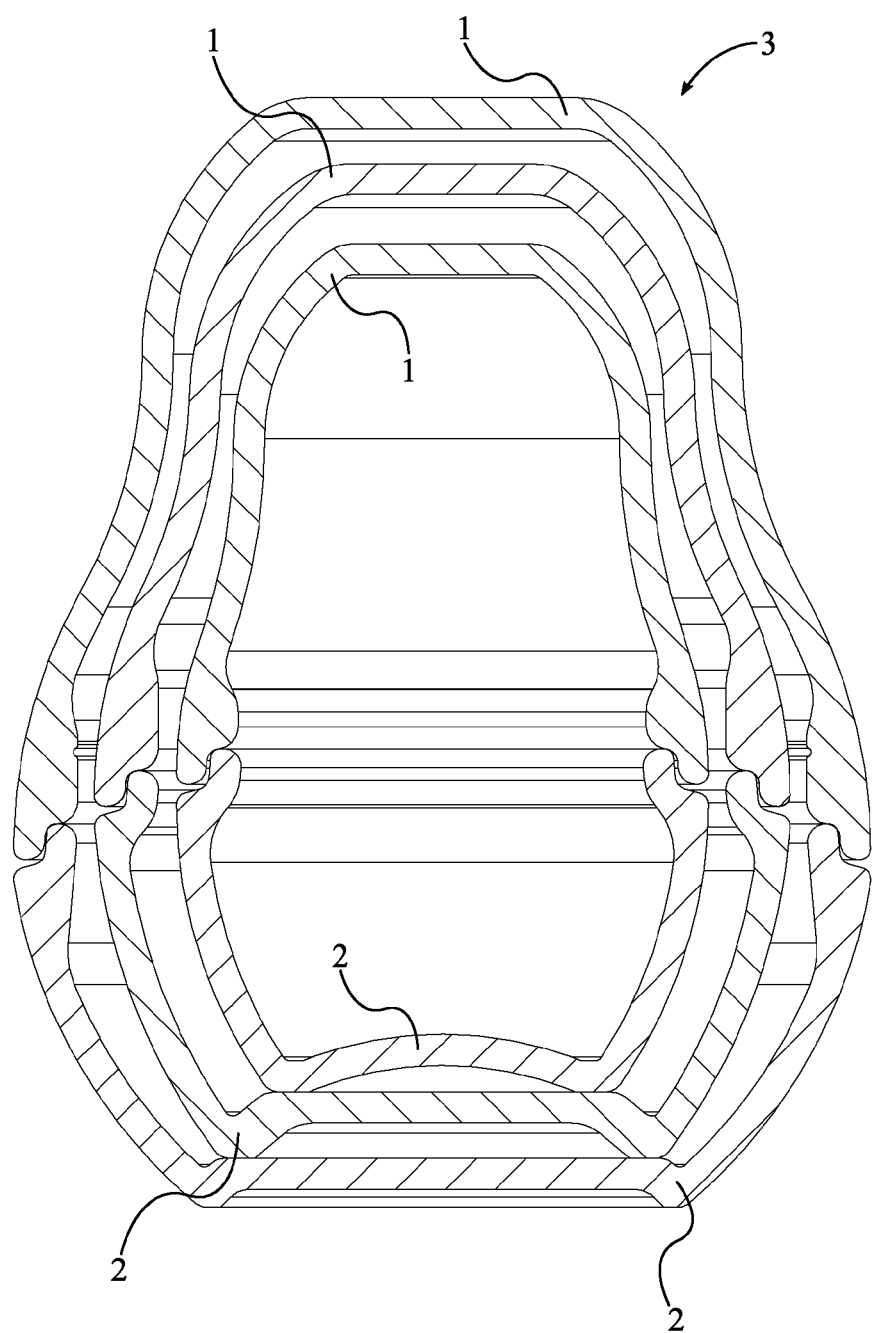
FIG. 5 is a cross-sectional view of the present invention in a collapsed state.

As can be seen in FIGS. 4 and 5, the first measuring cup 1 and the second measuring cup 2 can be detachably connected to each other in order to form each of the plurality of nesting dolls 3. The first measuring cup 1 is positioned upon the second measuring cup 2 so that the opening of the first measuring cup 1 is concentric to the opening of the second measuring cup 2. The first brim 13 is positioned adjacent to the second brim 23 so that the first notch 14 can interlock with the second notch 24. Thus, the first measuring cup 1 and the second measuring cup 2 form a kind of capsule for each of the plurality of nesting dolls 3. Interlocking the first notch 14 to the second notch 24 also prevents the first measuring cup 1 from sliding off the second measuring cup 2. The first notch 14 and the second notch 24 also allow the first measuring cup 1 to be easily pulled off the second measuring cup 2 with a small amount of force.

Figure 10:
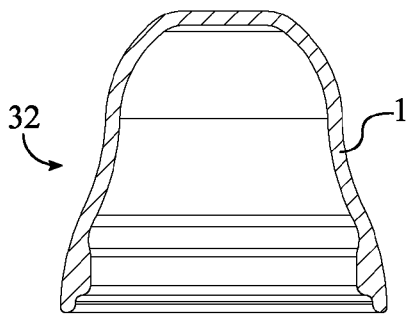
FIG. 10 is a cross-sectional view of an arbitrary nesting doll and a next-largest nesting doll.
Figure 10:
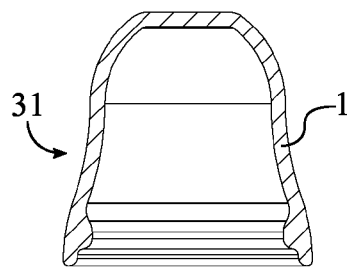
Figure 10:
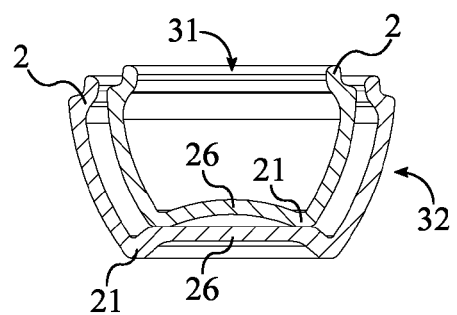

The present invention is designed so the first measuring cup 1 and the second measuring cup 2 for each of the plurality of nesting dolls 3 can be easily grasped by a user. The first measuring cup 1 for each of the plurality of nesting dolls 3 can be grasped from the top and lifted off of the second measuring cup 2. The second measuring cup 2 for each of the plurality of nesting dolls 3 is positioned in a pyramid formation, which is created by stacking the second measuring cup 2 for each of the plurality of nesting dolls 3 onto each other. For every arbitrary doll 31 with a next-largest doll 32, the arbitrary doll 31 is elevated from the next-largest doll 32, which is shown in FIG. 10. The second flat base 21 of the arbitrary doll 31 needs to be situated upon the pedestal 26 of the next-largest doll 32, which raises the second brim 23 of the arbitrary doll 31 above the second brim 23 of the next-largest doll 32. Thus, a user can cleanly grasp the second brim 23 of the arbitrary doll 31 because the second brim 23 of the arbitrary doll 31 is outside of the second lateral portion 22 of the next-largest doll 32. The second measuring cup 2 of the arbitrary doll 31 can be easily removed from the second measuring cup 2 of the next-largest doll 32 without having to turn any components upside down and risk them falling out and breaking because the plurality of nesting dolls 3 is preferably made of ceramic.

The present invention is also designed with informative and aesthetically-pleasing visual markers. In reference to FIG. 3A, one such visual marker is a first volume marker for the first measuring cup 1. The first volume label 15 indicates what volume that the first measuring cup 1 is able to contain when the first measuring cup 1 is filled to the first brim 13. The first volume label 15 can be positioned anywhere on the first measuring cup 1. In the preferred embodiment of the present invention, the first volume label 15 is located within the first lateral portion 12 and is centrally positioned onto the first flat base 11, which allows a user to see the first volume label 15 before filling the first measuring cup 1 with the substance. Likewise, another such visual marker is a second volume label 25 for the second measuring cup 2, which is shown in FIG. 3B. The second volume label 25 indicates what volume that the second measuring cup 2 is able to contain when the second measuring cup 2 is filled to the second brim 23. The second volume label 25 can be positioned anywhere on the second measuring cup 2. In the preferred embodiment, the second volume label 25 is located within the second lateral portion 22 and is centrally positioned onto the pedestal 26, which allows a user to see the second volume label 25 before filling the second measuring cup 2 with the substance. In reference to FIGS. 1 and 2, another such visual marker is a painted graphic 4 for each of the plurality of nesting dolls 3. In the preferred embodiment, the painted graphic 4 should resemble those of traditional Matryoshka dolls but could be used to depict any aesthetic theme amongst the plurality of nesting dolls 3. The painted graphic 4 is positioned across the combined outer surface of the first lateral portion 12 and the second lateral portion 22 so that the painted graphic 4 of the next-smallest doll can be seen when an arbitrary doll is opened.

In the preferred embodiment of the present invention, each of the plurality of nesting dolls 3 has a small gap of approximately 2-3 millimeters between each other when the plurality of nesting dolls 3 is in the stacked position. When the present invention is not being shipped, the small gap does not serve a function. The small gap allows for the use of packing materials while shipping the present invention. Ideally, the inner nesting dolls are each packaged in a foam bag. The small gap provides enough room such that one inner nesting doll and its foam bag can be stacked within another inner nesting doll. This allows the present invention to be safely shipped and ensures that its components remain undamaged. Additionally, this present invention allows its components to be shipped in their stacked position, thus reducing the amount of shelf space needed to store the present invention.

Although the invention has been explained in relation to its preferred embodiment, it is to be understood that many other possible modifications and variations can be made without departing from the spirit and scope of the invention as hereinafter claimed.

What is claimed is:

1. A system for decorative space-saving measuring cups comprises:
   a plurality of nesting dolls;
   each of said plurality of nesting dolls being a different sequential size;
   each of said plurality of nesting dolls comprises a first measuring cup and a second measuring cup;
   said first measuring cup being sized to hold a larger volume than said second measuring cup;
   said first measuring cup comprises a first flat base, a first lateral portion, a first brim, and a first notch; and
   said second measuring cup comprises a second flat base, a second lateral portion, a second notch, and an pedestal.

2. The system for decorative space-saving measuring cups as claimed in claim 1 comprises:
   said first flat base being perpendicularly positioned to said first lateral portion;
   said first brim being perimetrically connected to said first lateral portion;

said first brim being positioned opposite to said first flat base along said first lateral portion; and said first notch being integrated around said first brim.

3. The system for decorative space-saving measuring cups as claimed in claim 1 comprises:

said second flat base being perpendicularly positioned to said second lateral portion;

said second brim being perimetrically connected to said second lateral portion;

said second brim being positioned opposite to said second flat base along said second lateral portion; and said second notch being integrated around said second brim.

4. The system for decorative space-saving measuring cups as claimed in claim 1 comprises:

said first measuring cup being positioned upon said second measuring cup;

said first brim being positioned adjacent to said second brim; and said first notch interlocking to said second notch.

5. The system for decorative space-saving measuring cups as claimed in claim 1 comprises:

said pedestal being located inside said second lateral portion; and said pedestal being centrally connected onto said second flat base.

6. The system for decorative space-saving measuring cups as claimed in claim 1 comprises:

said second measuring cup for each of said plurality of nesting dolls being positioned in a pyramid formation;

said plurality of nesting dolls comprises an arbitrary doll and a next-largest doll;

said second flat base of said arbitrary doll being situated upon said pedestal of said next-largest doll; and said second brim of said arbitrary doll being located outside said second lateral portion of said next-largest doll.

7. The system for decorative space-saving measuring cups as claimed in claim 1 comprises:

said first measuring cup further comprises a first volume label;

said first volume label being located inside said first lateral portion; and said first volume label being centrally positioned onto said first flat base.

8. The system for decorative space-saving measuring cups as claimed in claim 1 comprises:

said second measuring cup further comprises a second volume label;

said second volume label being located inside said second lateral portion; and said second volume label being centrally positioned onto said pedestal.

9. The system for decorative space-saving measuring cups as claimed in claim 1 comprises:

each of said plurality of nesting dolls further comprises a painted graphic; and said painted graphic being positioned across a combined outer surface of said first lateral portion and said second lateral portion.

10. A system for decorative space-saving measuring cups comprises:

a plurality of nesting dolls;

each of said plurality of nesting dolls being a different sequential size;

each of said plurality of nesting dolls comprises a first measuring cup and a second measuring cup;

said first measuring cup being sized to hold a larger volume than said second measuring cup;

said first measuring cup comprises a first flat base, a first lateral portion, a first brim, and a first notch;

said second measuring cup comprises a second flat base, a second lateral portion, a second notch, and an pedestal;

said pedestal being located inside said second lateral portion;

said pedestal being centrally connected onto said second flat base;

said second measuring cup for each of said plurality of nesting dolls being positioned in a pyramid formation;

said plurality of nesting dolls comprises an arbitrary doll and a next-largest doll;

said second flat base of said arbitrary doll being situated upon said pedestal of said next-largest doll; and said second brim of said arbitrary doll being located outside said second lateral portion of said next-largest doll.

11. The system for decorative space-saving measuring cups as claimed in claim 10 comprises:

said first flat base being perpendicularly positioned to said first lateral portion;

said first brim being perimetrically connected to said first lateral portion;

said first brim being positioned opposite to said first flat base along said first lateral portion;

said first notch being integrated around said first brim;

said second flat base being perpendicularly positioned to said second lateral portion;

said second brim being perimetrically connected to said second lateral portion;

said second brim being positioned opposite to said second flat base along said second lateral portion; and said second notch being integrated around said second brim.

12. The system for decorative space-saving measuring cups as claimed in claim 10 comprises:

said first measuring cup being positioned upon said second measuring cup;

said first brim being positioned adjacent to said second brim;

said first notch interlocking to said second notch;

each of said plurality of nesting dolls further comprises a painted graphic; and said painted graphic being positioned across a combined outer surface of said first lateral portion and said second lateral portion.

13. The system for decorative space-saving measuring cups as claimed in claim 10 comprises:

said first measuring cup further comprises a first volume label;

said first volume label being located inside said first lateral portion;

said first volume label being centrally positioned onto said first flat base;

said second measuring cup further comprises a second volume label;

said second volume label being located inside said second lateral portion; and said second volume label being centrally positioned onto said pedestal.

14. A system for decorative space-saving measuring cups comprises:

a plurality of nesting dolls;

each of said plurality of nesting dolls being a different sequential size;

each of said plurality of nesting dolls comprises a first measuring cup and a second measuring cup;
said first measuring cup being sized to hold a larger volume than said second measuring cup;
said first measuring cup comprises a first flat base, a first lateral portion, a first brim, and a first notch;
said second measuring cup comprises a second flat base, a second lateral portion, a second notch, and an pedestal;
said first flat base being perpendicularly positioned to said first lateral portion;
said first brim being perimetrically connected to said first lateral portion;
said first brim being positioned opposite to said first flat base along said first lateral portion;
said first notch being integrated around said first brim;
said second flat base being perpendicularly positioned to said second lateral portion;
said second brim being perimetrically connected to said second lateral portion;
said second brim being positioned opposite to said second flat base along said second lateral portion; and
said second notch being integrated around said second brim.
said pedestal being located inside said second lateral portion;
said pedestal being centrally connected onto said second flat base;
said second measuring cup for each of said plurality of nesting dolls being positioned in a pyramid formation;
said plurality of nesting dolls comprises an arbitrary doll and a next-largest doll;
said second flat base of said arbitrary doll being situated upon said pedestal of said next-largest doll; and
said second brim of said arbitrary doll being located outside said second lateral portion of said next-largest doll.

15. The system for decorative space-saving measuring cups as claimed in claim 14 comprises:
said first measuring cup being positioned upon said second measuring cup;
said first brim being positioned adjacent to said second brim;
said first notch interlocking to said second notch;
each of said plurality of nesting dolls further comprises a painted graphic; and
said painted graphic being positioned across a combined outer surface of said first lateral portion and said second lateral portion.

16. The system for decorative space-saving measuring cups as claimed in claim 14 comprises:
said first measuring cup further comprises a first volume label;
said first volume label being located inside said first lateral portion;
said first volume label being centrally positioned onto said first flat base;
said second measuring cup further comprises a second volume label;
said second volume label being located inside said second lateral portion; and
said second volume label being centrally positioned onto said pedestal.

* * * * *